United States Patent Office 3,387,938
Patented June 11, 1968

3,387,938
PROCESS FOR OR RELATING TO THE PRO-
DUCTION OF HYDROGEN PEROXIDE
John Philip Leaver, Harpenden, England, assignor to
Laporte Chemicals Limited, Kingsway, Luton, England,
a British company
No Drawing. Filed June 20, 1966, Ser. No. 558,591
Claims priority, application Great Britain, June 21, 1965,
26,112/65
24 Claims. (Cl. 23—207)

ABSTRACT OF THE DISCLOSURE

Hydrogen peroxide solutions may be purified from contaminants by passage through an ion exchange material which does not enter into substantial ion exchange with the ions of the contaminants, but which absorbs hydrogen peroxide, and elution from the ion exchange materials. Strong acid cation exchangers are preferable.

---

This invention relates to a process for the production of hydrogen peroxide.

It is well-known that hydrogen peroxide can be manufactured by processes employing organic intermediates. In one such process an alkylated anthraquinone is hydrogenated in a solvent system by means of hydrogen in the presence of a catalyst to form the corresponding alkylated quinol which, after separation from the catalyst, is oxidised to produce hydrogen peroxide with regeneration of the alkylated anthraquinone. The hydrogen peroxide is then removed, usually by aqueous extraction. Such a process can be operated in a cyclic manner by recirculating the alkylated anthraquinone to the hydrogenation stage after the removal of the hydrogen peroxide.

The extracted aqueous hydrogen peroxide, however, is a crude material containing a number of impurities, for instance it is normally saturated with the solvents used in the cyclic process and may also contain traces of the organic intermediate used. In addition to this, the crude aqueous hydrogen peroxide may well also contain other substances formed by degradation of the solvent and/or organic intermediate. The presence of these other compounds may be indicated for example, by the acidity of the hydrogen peroxide due to its content of organic acids and/or by its non-volatile impurity content. If the extracted hydrogen peroxide is fractionally distilled in vacuo to concentrate it the dissolved solvents are largely recovered in the overhead stream. The degradation compounds appear to some extent in the fractionated product, but a large proportion remains in the boiler residue. Such boiler residue is hydrogen peroxide of high concentration, often above 65% w./w., and it usually contains traces of solvent, organic acids, for instance acetic acid, organic degradation products of, for instance, solvent or organic intermediate, traces of metal cations derived from the apparatus used in the manufacture or distillation of the hydrogen peroxide and often substantial quantities of one or more dissolved contaminant ionic compounds, for instance disodium dihydrogen pyrophosphate, which have been added during manufacture or distillation as, for instance, stabilisers. Such hydrogen peroxide is often of hazy appearance and of undesirably high acidity.

In another process an alcohol, usually a secondary alcohol, for instance isopropanol, is used as organic intermediate and hydrogen peroxide is produced from it by oxidation. Again the product is a crude material, containing, for example, impurities resulting from the oxidative degradation of the intermediate. Here also concentration by distillation of the product gives rise to an impure residue.

In a third type of process hydrogen peroxide is produced by electrolysis of a solution of one or more sulphates, suitably an ammonium sulphate, to give the perdisulphate, which can then be hydrolysed to yield hydrogen peroxide. In such a process sulphate ion is often present as an impurity in the hydrogen peroxide product. Again concentration of the product can increase the concentration of impurities.

It is an object of this invention to improve the quality of crude grades of hydrogen peroxide for example those mentioned above.

Techniques are known for the purification of aqueous hydrogen peroxide solution by contacting them with ion exchange resins which have exchange capacity in respect of at least some contaminant ions. Where it is desired to remove both anionic and cationic contaminants from the hydrogen peroxide solutions by means of such techniques it is necessary to use both anion and cation exchange resins either in separate succeeding beds or in a single mixed resin bed. In either case the process either has to be stopped periodically while the resin is being regenerated or, alternatively, duplicate resin beds have to be used alternately with the exhausted beds while they are being regenerated. Furthermore where a mixed resin bed is used the different resins therein have to be separated before either can be regenerated.

This invention provides a process for the purification of an aqueous hydrogen peroxide solution by separating therefrom a selected contaminant compound present in ionic form comprising the steps of treating the solution by contacting it with a body of ion exchange material which is capable of absorbing and is stable to oxidation by the aqueous hydrogen peroxide and is for the majority of the period of contact in an ionic form which cannot enter into substantial nett ion exchange with either ion of the selected contaminant, of separating the treated solution from contact with the ion exchange material and of separating from the ion exchange material absorbed purified equeous hydrogen peroxide.

Advantageously the exchange material cannot enter into substantial nett ion exchange for the whole of the period of contact. Most desirably the ion exchange material is an ion exchange resin and, alternatively or additionally, is in an ionic form corresponding to an ion of the selected contaminant. In a further, most advantageous embodiment of the invention a single ion exchange resin is employed.

By the term "no nett ion exchange" we mean no ion exchange which changes the stable ionic form of the resin. In practice an ion exchange resin will, to at least a small extent, be in a dynamic equilibrium with ions of a solution with which it is in contact and there will be some exchange of ions between the resin and the solution even where the only ions in the solution are those corresponding to the ionic form of the resin. The last mentioned situation will not result in a change in ionic form of the resin and may apply in our invention.

The ease of ion exchange between ions of like charge on an ion exchanger and in a contacting polar solvent depends on a number of factors amongst which are, the nature of the forces binding the ion to the ion exchanger, the concentration of the exchanging ion, the quantitative charge of the ions entering into the exchange, the relative sizes of the ions, the accessibility of the lattice ions and solvent effects. In practice, however whether nett exchange will take place may be determined by simple experiment and any ionic form in which nett exchange with an ion of the selected contaminant takes place to any substantial extent is excluded from use in this invention. Thus to separate according to our invention, di-sodium-pyrophosphate from an aqueous hydrogen peroxide solution one preferably uses a resin in either the sodium or the pyrophosphate form and one may not use a resin in the hydrogen or hydroxyl form.

In practice the ion exchange resins used in our invention possess the properties of a true electrolytic solution except for a limitation on the movement of the ions. Because of its fixed ionic concentration the resin will tend to exclude all ions in the solution being purified, particularly where the solution has an ionic concentration substantially lower than that of the resin, whereas low molecular weight non-ionic compounds are readily absorbed into the resin matrix. This behaviour provides a suitable means of separating hydrogen peroxide which is non-ionic from ionic contaminants.

In contrast to the known purification techniques discussed above the process of our invention enables both anionic and cationic contaminants to be separated from the hydrogen peroxide solution by means of a single resin which may be either of an anionic or a cationic type. Furthermore our process may be operated without the need for resin regeneration which was an essential feature in the known techniques mentioned.

Any ion exchange resin satisfying the essential conditions set out above may be used in this invention. It may be in reticular form, for instance macro-reticular form but is, preferably, in gel form. It may, chemically, be based on, for example, polystyrene or methacrylic acid and is, preferably, cross-linked with di-vinyl benzene. Advantageously divinyl benzene is used in from 2% to 20% by weight preferably from 4% for instance 8% by weight of the resin. While weak acid or base resins may be used in the invention strong acid or base ion exchange resins are preferably used particularly strong acid cation exchange resins.

Preferably the resin employed has a high occluded volume, for instance of at least 1 ml./g., and also gives a large difference between the distribution coefficient in relation to hydrogen peroxide and that in relation to any contaminant ion. Where it is primarily desired to remove one major ionic contaminant from the crude hydrogen peroxide a suitable resin will be that which gives a large difference between the distribution co-efficient in relation to hydrogen peroxide and that merely in relation to the ions of the major contaminant.

By "distribution coefficient" we mean a value equal to the ratio of the concentration of hydrogen peroxide, or of a contaminant ion, in the solution occluded by the resin to the concentration in the aqueous phase outside the resin. This ratio may be determined for hydrogen peroxide, and for the contaminant ion, (a) from the occluded volume of the resin which may be directly determined, for instance by weighing a water saturated resin before and after drying, and (b) from the difference in the quantity of hydrogen peroxide, and of the contaminant ion, in a solution of crude hydrogen peroxide before treating a known volume of resin therewith and in the residual solution after the treatment. The distribution coefficient in relation to hydrogen peroxide, and in relation to a contaminant ion, are denoted herein respectively by the symbols $$K_{d(H_2O_2)} \text{ and } K_{d(ion)}$$

Advantageously the difference between these distribution coefficients is at least 0.25.

The suitability of a resin for use in the present invention for separation of hydrogen peroxide from a given ionic contaminant is a function of the expression $$VoK_{d(H_2O_2)} - K_{d(ion)}$$

which is known as the "separation factor" ($\Delta Vm$.) $Vo$ being the occluded volume of 1 g. of the dry resin in mls. Advantageously the resin gives a $K_{d(H_2O_2)}$ value of at least 1.0 preferably not substantially less than 1.5. Preferably the resin gives a $K_{d(ion)}$ value, in respect of either ion of the major contaminant compound, of less than 0.5. Preferably the $\Delta Vm$. value is at least 1.

The dissolved ionic contaminant is commonly disodium dihydrogen pyrophosphate, which is often added in substantial quantities to hydrogen peroxide in the course of manufacture and gives rise to sodium and di-hydrogen pyrophosphate ions in solution, or ammonium nitrate. The suitability of certain resins for separation of disodium dihydrogen pyrophosphate from hydrogen peroxide is indicated by reference to the $K_{d(H_2O_2)}$, $K_{d(ion)}$ and $Vm$. values given by each resin set out in the following table.

TABLE I

| Resin | $K_d$ | | $\Delta Vm$ |
|---|---|---|---|
| | $H_2O_2$ | Pyrophosphate ion | |
| Amberlyst 15 (Na=Form) | 1.03 | 0.45 | 0.54 |
| ZeoKarb 225 (Na=Form) | 0.78 | 0.07 | 0.30 |
| Amberlite IR120 (Na=Form) | 1.52 | 0.20 | 1.1 |
| Amberlite CG120 (Na=Form) | 1.45 | 0.49 | 1.0 |

(The words Amberlyst, ZeoKarb and Amberlite used in Table I or hereafter are trademarks.)

Advantageously the resin used to separate disodium dihydrogen pyrophosphate is any of those listed in Table I above or Amberlite IRA400 or CG400, in the dihydrogen pyrophosphate form, but preferably is Amberlite IR120 or CG120 in the sodium form. De-Acidite FF (trademark) may also, advantageously, be used.

The present process is advantageously operated by passing the crude hydrogen peroxide through a body, for example a bed, of the resin preferably downward through a column of the resin. The first fractions of solutions which leave the column contain little or no hydrogen peroxide, which has been retarded, and when hydrogen peroxide does start to appear in the effluent in appreciable quantities the feed of crude hydrogen peroxide to the column should desirably be stopped and replaced by a water wash to flush the absorbed hydrogen peroxide from the resin. This will produce fractions of effluent containing purified hydrogen peroxide which are separated, fractions containing an appreciable quantity of both hydrogen peroxide and contaminant, which may be returned to the column for further treatment, and fractions containing ionic contaminants and little or no hydrogen peroxide, which are discarded. After the water washing, further crude hydrogen peroxide solution may be passed through the resin followed by a further water wash, and a continuous process operated in this alternate manner is preferred. While hydrogen peroxide purified by such a process is generally of lower concentration than the crude feed a product more concentrated than the feed may be obtained by using known effluent recycle methods.

This invention therefore particularly provides a cyclic process for the purification of an aqueous hydrogen peroxide solution by separating therefrom a selected contaminant compound present in ionic form comprising the steps of treating the solution by passing portions thereof alternately with water through a column of resin having an occluded volume of at least 1 ml./g. a $K_{d(H_2O_2)}$ value, as herein defined of at least 1.0, a $K_{d(ion)}$ value, as herein defined, in respect of either ion of the major contaminant compound of less than 0.75 being stable to oxidation by aqueous hydrogen peroxide and being in an ionic form corresponding to an ion of the selected contaminant compound, separating the resulting effluent into fractions containing substantially solely hydrogen peroxide and water, fractions containing substantially solely selected contaminant ions and water and fractions containing an appreciable proportion of both hydrogen peroxide selected contaminant ions and water, recovering the first-mentioned fractions, recycling the last-mentioned fractions for further treatment and discarding the remaining fractions.

Advantageously the flow rate of hydrogen peroxide solution through a bed of resin is in the region of 0.1 gallon per cubic foot of bed per minute. The hydrogen peroxide which may be treated according to this invention is advantageously up to 70% concentration w./w. or even more.

We have said that certain crude hydrogen peroxides contain solvent traces and traces of metal cations derived from apparatus used in the manufacture of the hydrogen peroxide.

If desired solvent may be removed by the process of U.S. Patent 3,321,279. Therefore advantageously the crude hydrogen peroxide is treated by the process of the above identified copending application before being subjected to the present process.

Additional trace contaminants present in crude hydrogen peroxide may be cations or, for instance, one or more of iron, cobalt, chromium, magnesium or aluminium. While resins as used in the present process exclude such ions at least a small proportion thereof would eventually tend to accumulate on cation exchange resins when used and since at least some of these cations, for instance ferrous and ferric ions, act as hydrogen peroxide decomposition catalysts this accumulation is disadvantageous. Therefore the crude hydrogen peroxide may be passed through a small separate first column of cation exchange resin so as to separate metal cations therefrom. To enable the main column of resin to be operated continuously according to this invention advantageously a second similar column of cation exchange resin is provided to separate metal cations while the first column is being regenerated.

The present invention will now be illustrated by the following examples.

Example 1

A column of ZeoKarb 225 cation exchange resin having an occluded volume of 1 ml./g. dry resin was set up in 2 inch diameter glass pipe. The resin was washed thoroughly with 10% HCl (25 litres) to remove iron, washed free of acid with demineralised water, converted to the sodium form with 10 litres of 10% NaCl and finally washed free of chloride with demineralised water. From this stage the column was never allowed to run dry. The volume of resin was 3.2 litres in the sodium form and the bed height was 5 feet. Crude hydrogen peroxide used has the analysis:

57.6% $H_2O_2$ w./w.
3000 m.g.p.l. dihydrogen pyrophosphate ion as $P_2O_5$
820 m.g.p.l. $NO_3$
22.2 m.g.p.l. Al
2.90 g.p.l. total carbon.

500 ml. of this material was fed to the top of the resin column, followed by demineralised water, all at a flow rate of 50 ml./min. (equivalent to 0.5 gallon/sq. ft. bed cross section/minute). The effluent from the column was collected in fractions of 200 ml. which were analysed for $H_2O_2$ and pyrophosphate. The results are set out in Table II.

TABLE II

| Fraction No. | $H_2O_2$, number meq. per fraction | Pyrophosphate as $P_2O_5$, m.g.p.l. |
| --- | --- | --- |
| 1-5 | Nil | Nil |
| 6 | Nil | 104 |
| 7 | 0.2 | 2,000 |
| 8 | 0.4 | 2,800 |
| 9 | 2.2 | 2,300 |
| 10 | 95.1 | 300 |
| 11 | 897.0 | 68 |
| 12 | 2,043.0 | 24 |
| 13 | 3,416.0 | 27 |
| 14 | 4,671.0 | 30 |
| 15 | 5,110.0 | 14 |
| 16 | 2,634.0 | 10 |
| 17 | 1,339.0 | 7 |
| 18 | 141.8 | 6 |
| 19 | 23.9 | <5 |
| 20 | 5.2 | <5 |
| 21 | 2.3 | 7 |
| 22 | 1.4 | <5 |
| 23 | 1.3 | <5 |
| 24 | 1.1 | <5 |
| 25 | 0.8 | <5 |

Example II

Employing the same previously wetted resin, column and solution of crude hydrogen peroxide as that used in Example I three cycles were conducted each of addition of 500 ml. of crude hydrogen peroxide followed by 2300 ml. of demineralised water. After discarding the first 2000 ml. of effluent which represented the void volume of the resin and the portion of the effluent containing most of the phosphate ion, three product fractions were collected each of 1400 ml. and alternately with these three other fractions each of 1400 ml. were discarded. The result of analysis of each product fraction is given in Table III.

TABLE III

| Fraction No. | $H_2O_2$ recovery, percent | $H_2O_2$ product, percent w./w. | Pyrophosphate ion as $P_2O_5$, m.g.p.l. | $NO_3^-$, m.g.p.l. | $Al^+$, m.g.p.l. |
| --- | --- | --- | --- | --- | --- |
| 1 | 93.7 | 22.00 | 30 | 8 | 0.2 |
| 2 | 89.0 | 20.90 | 82 | 19 | 1.7 |
| 3 | 96.9 | 22.55 | 54 | 8 | 1.4 |

What I claim is:

1. A process for the purification of an aqueous hydrogen peroxide solution by separating therefrom a selected contaminant compound present in ionic form comprising the steps of treating the solution by contacting it with a body of ion exchange material which is capable of absorbing and is stable to oxidation by the aqueous hydrogen peroxide and is, for the majority of the period of contact, in an ionic form which cannot enter into substantial nett ion exchange with either ion of the selected contaminant compound, at a temperature at which the material is stable to hydrogen peroxide, of separating treated solution from contact with the ion exchange material and of separating from the ion exchange material absorbed purified aqueous hydrogen peroxide.

2. A process as claimed in claim 1 wherein the ion exchange material is in an ionic form corresponding to an ion of the selected contaminant compound.

3. A process as claimed in claim 1 wherein the selected contaminant is the major contaminant.

4. A process as claimed in claim 1 wherein the ion exchange material has susbtantially no nett ion exchange capacity in respect of either ion of the selected contaminant compound for the whole of the period of contact.

5. A process as claimed in claim 1 wherein the ion exchange material is an ion-exchange resin.

6. A process for the purification of an aqueous hydrogen peroxide solution by separating therefrom a selected contaminant compound present in ionic form comprising the steps of treating the solution with a body of a single ion exchange resin which is capable of absorbing and is stable to oxidation by the aqueous hydrogen peroxide and is, for the majority of the period of contact, in an ionic form which cannot enter into substantial nett ion exchange with either ion of the seelcted contaminant compound, at a temperature at which the resin is stable to hydrogen peroxide, of separating treated solution from contact with the ion exchange material and of separating from the ion exchange material absorbed purified aqueous hydrogen peroxide.

7. A process as claimed in claim 6 wherein the resin has a gel structure.

8. A process as claimed in claim 6 wherein the resin is a member selected from the group consisting of strongly acidic cation exchange resins and strongly basic anion exchange resins.

9. A process as claimed in claim 6 wherein the resin has a sulphonated polystyrene base.

10. A process as claimed in claim 6 wherein the resin has a sulphonated methyl methacrylate base.

11. A process as claimed in claim 6 wherein the resin used is a strongly acidic cation exchange resin with a sulphonated polystyrene or methyl methyacrylate base.

12. A process for the purification of an aqueous hydrogen peroxide solution by separating therefrom a selected contaminant compound present in ionic form comprising the steps of treating the solution with a body of a single ion exchange resin which is capable of absorbing and is stable to oxidation by the aqueous hydrogen peroxide and is, for the majority of the period of contact, in an ionic form which cannot enter into substantial nett ion exchange with either ion of the selected contaminant compound, at a temperature at which the resin is stable to hydrogen peroxide, of separating treated solution from contact with the ion exchange material and of separating from the ion exchange material absorbed purified aqueous hydrogen peroxide, and wherein the resin has a fixed ionic concentration greater than the ionic concentration of the aqueous hydrogen peroxide being treated.

13. A process for the purification of an aqueous hydrogen peroxide solution by separating therefrom a selected contaminant compound present in ionic form comprising the steps of treating the solution with a body of a single ion exchange resin which is capable of absorbing and is stable to oxidation by the aqueous hydrogen peroxide and is, for the majority of the period of contact, in an ionic form which cannot enter into substantial nett ion exchange with either ion of the selected contaminant compound, at a temperature at which the resin is stable to hydrogen peroxide, of separating treated solution from contact with the ion exchange material and of separating from the ion exchange material absorbed purified aqueous hydrogen peroxide, and wherein the resin has an occluded volume of at least 1 ml./g.

14. A process for the purification of an aqueous hydrogen peroxide solution by separating therefrom a selected contaminant compound present in ionic form comprising the steps of treating the solution with a body of a single ion exchange resin which is capable of absorbing and is stable to oxidation by the aqueous hydrogen peroxide and is, for the majority of the period of contact, in an ionic form which cannot enter into susbtantial nett ion exchange with either ion of the selected contaminant compound, at a temperature at which the resin is stable to hydrogen peroxide, of separating treated solution from contact with the ion exchange material and of separating from the ion exchange material absorbed purified aqueous hydrogen peroxide, and wherein the resin gives a $K_{d(H_2O_2)}$ value of at least 1.0.

15. A process as claimed in claim 14 wherein the $K_{d(H_2O_2)}$ value given by the resin is not substantially less than 1.5.

16. A process as claimed in claim 14 wherein the $K_{d(H_2O_2)}-K_{d(Ion)}$ value is at least 0.25.

17. A process for the purification of an aqueous hydrogen peroxide solution by separating therefrom a selected contaminant compound present in ionic form comprising the steps of treating the solution with a body of a single ion exchange resin which is capable of absorbing and is stable to oxidation by the aqueous hydrogen peroxide and is, for the majority of the period of contact, in an ionic form which cannot enter into substantial nett ion exchange with either ion of the selected contaminant compound, at a temperature at which the resin is stable to hydrogen peroxide, of separating treated solution from contact with the ion exchange material and of separating from the ion exchange material absorbed purified aqueous hydrogen peroxide, and wherein the resin give a $K_{d(Ion)}$ value in respect of either ion of the selected contaminant compound, of less than 0.5.

18. A process for the purification of an aqueous hydrogen peroxide solution by separating therefrom a selected contaminant compound present in ionic form comprising the steps of treating the solution with a body of a single ion exchange resin which is capable of absorbing and is stable to oxidation by the aqueous hydrogen peroxide and is, for the majority of the period of contact, in an ionic form which cannot enter into substantial nett ion exchange with either ion of the selected contaminant compound, at a temperature at which the resin is stable to hydrogen peroxide, of separating treated solution from contact with the ion exchange material and of separating from the ion exchange material absorbed purified aqueous hydrogen peroxide, and wherein the resin gives a separation factor of at least 1.

19. A process for the purification of an aqueous hydrogen peroxide solution by separating therefrom a selected contaminant compound present in ionic form comprising the steps of passing the solution through a bed of an ion exchange resin which is capable of absorbing and is stable to oxidation by the aqueous hydrogen peroxide and is, for the majority of the period of contact, in an ionic form which cannot enter into substantial nett ion exchange with either ion of the selected contaminant compound, at a temperature at which the resin is stable to hydrogen peroxide of separating treated solution from contact with the ion exchange material and of separating from the ion exchange material absorbed purified aqueous hydrogen peroxide.

20. A process as claimed in claim 19 wherein the flow rate of hydrogen peroxide solution through the bed is 0.1 gal./per cu. ft. of bed per minute.

21. A process as claimed in claim 19 wherein hydrogen peroxide solution is passed through the resin in portions alternately with water, and fractions containing an appreciable proportion of hydrogen peroxide are separated from the resulting effluent.

22. A process as claimed in claim 19 wherein fractions containing an appreciable proportion of both hydrogen peroxide and selected contaminant ion are separated from the resulting effluent and are recycled for further treatment.

23. A cyclic process for the purification of an aqueous hydrogen peroxide solution by separating therefrom a selected contaminant compound present in ionic form comprising the steps of treating the solution by passing portions thereof through a column of resin alternately with water the resin having an occluded volume of at least 1 ml./g., a $K_{d(H_2O_2)}$ value, as herein defined, of at least 1.0, a $K_{d(Ion)}$ value as herein defined in respect of either ion of the major contaminant compound of not more than 0.75 being stable to oxidation by aqueous hydrogen peroxide and being in an ionic form corresponding to an ion of the selected contaminant compound, at a temperature at which the resin is stable to hydrogen peroxide, separating the resulting effluent into fractions containing substantially solely hydrogen peroxide and water, fractions containing substantially solely selected contaminant ions and water and fractions containing an appreciable proportion of both hydrogen peroxide, selected contaminant ions and water, recovering the first-mentioned fractions, recycling the last-mentioned fractions for further treatment and discarding the remaining fractions.

24. A process as claimed in claim 23 wherein the hydrogen peroxide solution is first passed through a body of cation exchange resin which has exchange capacity in respect of metal cations in the solution.

References Cited

UNITED STATES PATENTS 2,676,923    4/1954    Young _____ 23—207

OSCAR R. VERTIZ, *Primary Examiner.*

MILTON WEISSMAN, *Examiner.*

H. S. MILLER, *Assistant Examiner.*